Figure 1:
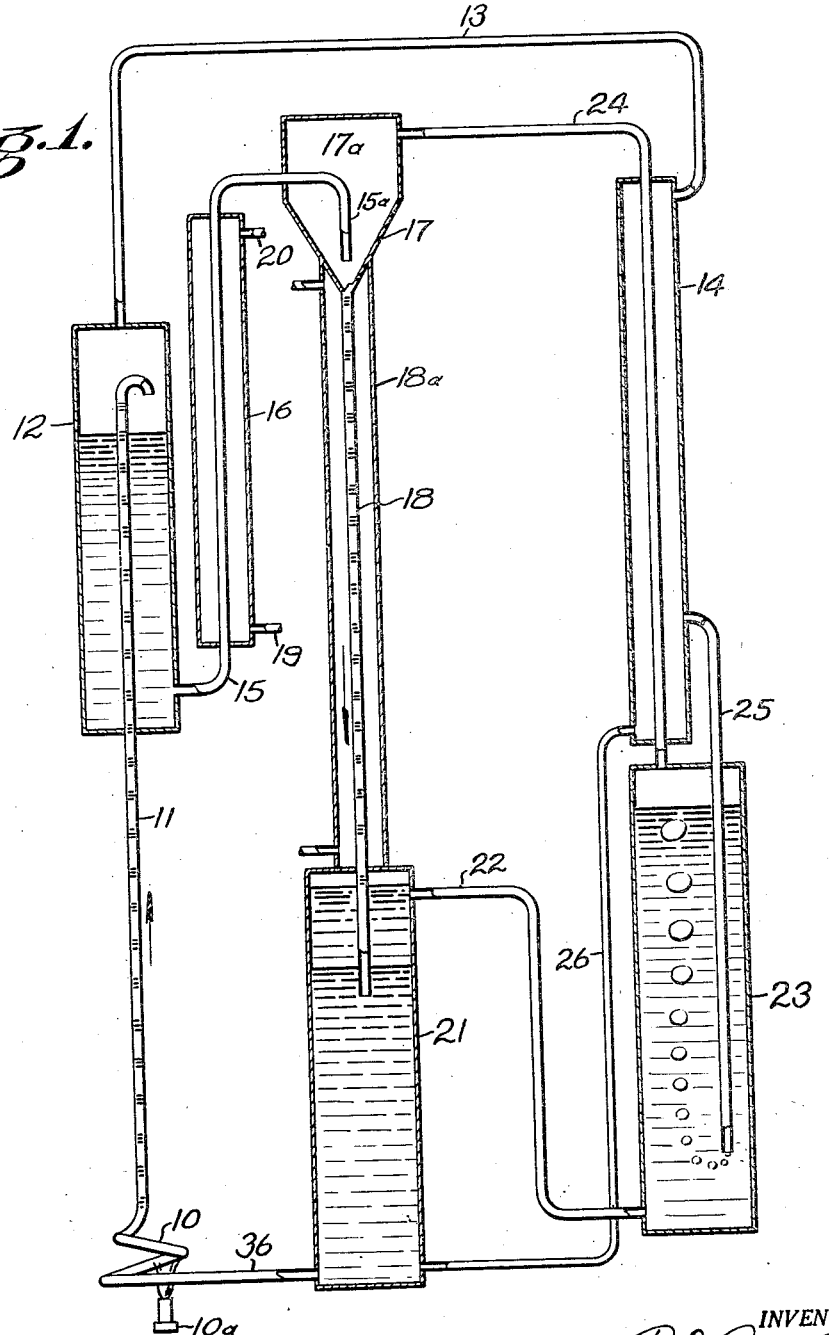

Aug. 30, 1932.  B. F. RANDEL  1,874,621

REFRIGERATION

Filed Oct. 27, 1930  2 Sheets-Sheet 1

INVENTOR.
B. F. Randel
BY
ATTORNEYS.

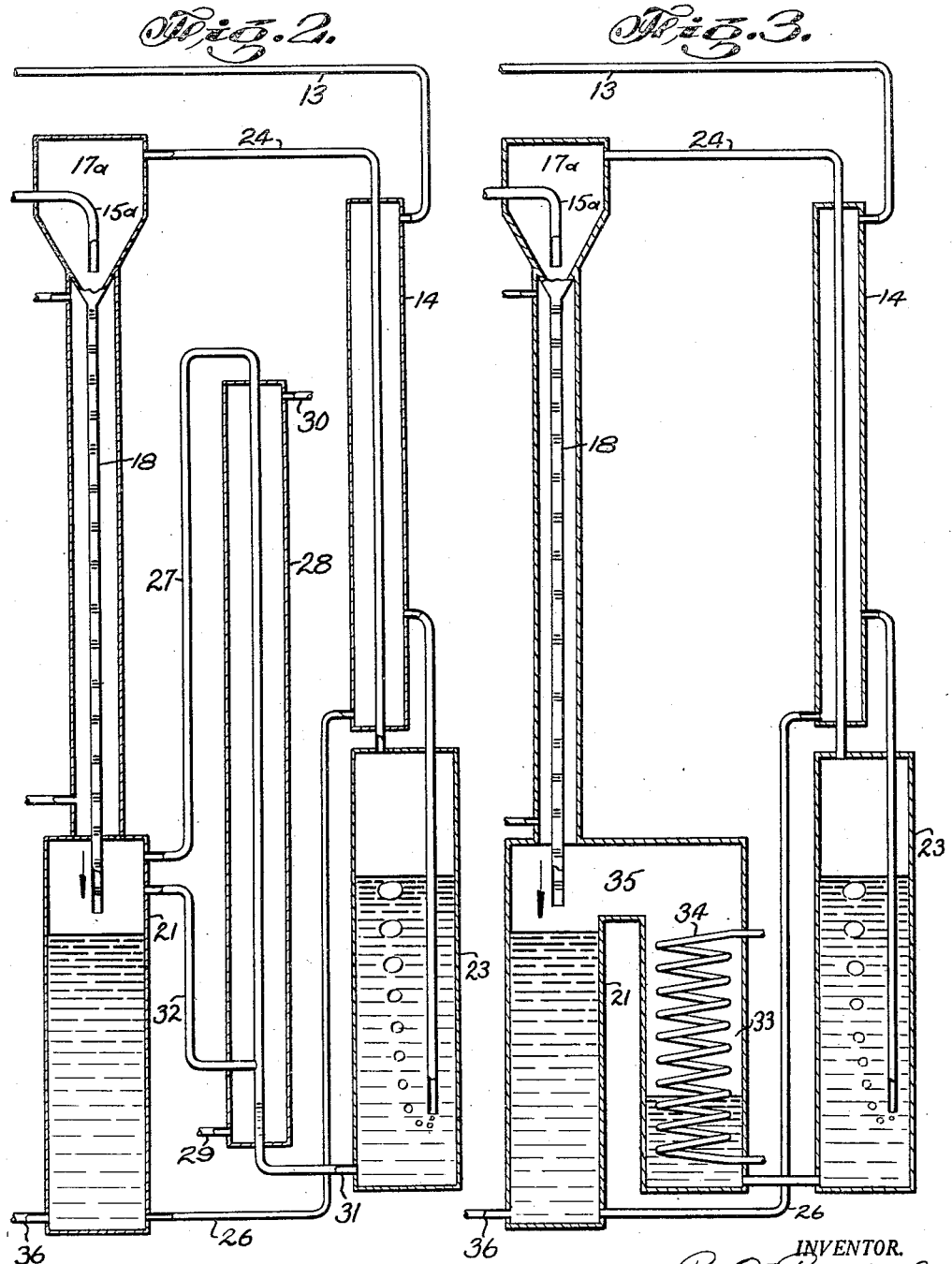

Patented Aug. 30, 1932

1,874,621

UNITED STATES PATENT OFFICE

BO FOLKE RANDEL, OF SAN DIEGO, CALIFORNIA, ASSIGNOR TO ELECTROLUX SERVEL CORPORATION, OF NEW YORK, N. Y., A CORPORATION OF DELAWARE

REFRIGERATION

Application filed October 27, 1930. Serial No. 491,426.

This invention relates to refrigerating systems of the absorption type in which an inert gas is used to equalize the pressure in the system, and is diffused through the liquid refrigerant to cause vaporization of the latter. A system of this type is fully disclosed in United States Letters Patent 1,781,541 to Einstein et al.

In a system of this type there are employed three mediums: An inert gas driven out of solution in a generator circulates through the evaporator and absorber and back to the generator; absorption liquid for the inert gas circulates between the generator and absorber; and refrigerant vaporizes in the evaporator, flows with the inert gas through the absorber, and is condensed, and returns to the evaporator. Any suitable combination of mediums may be used, as for example, ammonia, water, and hexane respectively are selected for the purpose of this description.

This invention has for its principal object to effect circulation in such a system by using the absorption liquid to inject the mixture of inert gas and refrigerant vapors into the absorber where the partial pressure of the refrigerant vapor is increased by the absorption of the inert gas and compressed by the weight of a column of absorption liquid.

This invention will be more readily understood by reference to the following description taken in connection with the accompanying drawings in which like reference characters indicate like parts.

In the drawings:

Fig. 1 is a diagrammatic showing of an absorption type refrigerating system embodying this invention in which the absorber and the condenser are combined;

Fig. 2, a modification of the system shown in Figure 1 in which a separate condenser is provided; and Fig. 3, a further modification of the system shown in Figure 1 in which there is a combined absorber and condenser of modified structure.

In the system shown in Fig. 1 of the drawings, strong ammonia liquor in a generator shown as a coil 10 is heated by a gas burner 10a, and rises through conduit 11, into receiver 12. Ammonia vapor driven out of solution flows through conduit 13 and heat exchanger 14 and is delivered through conduit 25 into the evaporator 23. Weak liquor from receiver 12 is delivered by conduit 15 through cooler 16 in which circulates cooling water through pipes 19 and 20 and into injector 17 where it discharges downwardly into absorber 18 through injector nozzle 15a.

Liquid refrigerant, for example hexane, in evaporator 23 receives heat from the surrounding atmosphere and vaporizes by diffusion into the ammonia vapor, bubbling therethrough from the opening of conduit 25. The ammonia and hexane vapors rise from evaporator 23 through heat exchanger 14 where they receive heat from the hot ammonia vapor from the receiver 12 and pass through conduit 24 into chamber 17a of injector 17. The mixture of vapors is carried into the absorber 18 by the injector action of the weak liquor issuing from injector tube 15a. In the absorber ammonia gas is absorbed by the weak liquor and therefore the pressure in chamber 17a is reduced and the partial pressure of the hexane vapor is increased. Hexane vapor will not be absorbed but will be carried along with ammonia vapor and liquor down through absorber 18. As shown, the absorber comprises a fall tube pump in which the hexane vapor which is not absorbed is gradually compressed as it is carried to the bottom by the weight of the descending fluid column. Strong ammonia liquor discharged from the bottom of the absorber collects in chamber 21 from where it is returned to the generator through conduit 36.

Due to the cooling action of water flowing around the absorber in jacket 18a and the increased pressure of the hexane vapor, the latter is condensed and collects in chamber 21 where it floats on the surface of the strong ammonia liquor. Conduit 22 conducts the liquid refrigerant from collecting chamber 21 to evaporator 23 in which the height of the liquid refrigerant depends upon the weight of the fluid column in the absorber 18. Conduit 26 is provided for the return to collecting chamber 21 of any liquid which may condense out in heat exchanger 14.

A modified form of this system is shown in Figure 2 in which the hexane does not condense in the absorber but is carried by the descending column therein to the collecting chamber 21 from where it passes through conduit 27 into condenser 28 which is supplied with circulating cooling water through conduits 29 and 30. When the ammonia gas is absorbed the partial pressure of the hexane vapor increases and it is compressed by the weight of the descending column a sufficient amount to allow condensation when the temperature is lowered in the condenser. Liquid hexane from condenser 28 passes through conduit 31 to the evaporator 23. In order to avoid any possibility of the system becoming gasbound, a bypass conduit 32 is connected between the lower portion of condenser 28 and the upper portion of receiving chamber 21 whereby any non-condensed ammonia vapor which may have been carried over with the hexane vapor into condenser 28 will be returned to collection chamber 21.

In Figure 3 is shown a modification of this system in which the hexane vapor is condensed in a chamber 33 by a cooling medium flowing through coil 34. The upper portion of the condensing chamber 33 is connected to the vapor space above the normal liquid level in collecting chamber 23 by a passage 35 which is so large that the condensing chamber 33 is in effect a continuation of collecting chamber 21. With this arrangement the system cannot become gas bound since any accumulation of ammonia vapor cannot increase above the pressure at which it will be absorbed.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. Refrigerating apparatus of the absorption type comprising a generator containing a water solution of ammonia, an evaporator containing liquid hexane, means for delivering ammonia gas from the generator to the evaporator, a fall tube pump connected to receive weak absorption liquid from the generator and vapor from the evaporator, cooling means for said pump, means for returning enriched absorption liquid from said pump to said generator, and means for conducting liquid hexane from said pump to said evaporator.

2. Refrigerating apparatus of the absorption type including a generator containing a solution of inert gas in an absorption liquid, an evaporator containing a volatile liquid insoluble in the absorption liquid, means for delivering gas expelled from solution in said generator to said evaporator, and a combined absorber and condenser comprising a fall tube pump connected to receive weak absorption liquid from the generator and vapor from the evaporator, said absorber-condenser also being connected for the return of enriched absorption liquid to the generator and volatile liquid to the evaporator.

3. Refrigerating apparatus of the absorption type comprising a generator containing a solution of inert gas in an absorption liquid, an evaporator containing a volatile liquid insoluble in the absorption liquid, means for delivering inert gas expelled from solution in the generator to the evaporator, a fall tube pump connected to receive weak absorption liquid from the generator and vapor from the evaporator, means for returning enriched absorption liquid from said pump to said generator, and means including a condenser for returning volatile liquid from said pump to said evaporator.

4. In refrigerating apparatus of the absorption type, a generator containing a solution of inert gas in an absorption liquid, an evaporator containing a volatile cooling liquid comparatively insoluble in the absorption liquid, means for delivering inert gas expelled from solution in the generator to the evaporator, a fall tube, an injector at the upper end of said fall tube connected to be supplied with weak absorption liquid from the generator and vapor from the evaporator, a collecting chamber at the lower end of said fall tube, a conduit from the lower part of said chamber to said generator for the return of enriched absorption liquid, and a condenser connected between the upper part of said chamber and said evaporator.

5. In refrigerating apparatus of the absorption type, a generator containing a solution of inert gas in an absorption liquid, an evaporator containing a volatile cooling liquid comparatively insoluble in the absorption liquid, means for delivering inert gas expelled from solution in the generator to the evaporator, a fall tube, an injector at the upper end of said fall tube connected to be supplied with weak absorption liquid from the generator and vapor from the evaporator, cooling means for said fall tube, a collecting chamber at the lower end of said fall tube, a conduit from said chamber to said generator for the return of enriched absorption liquid, and a conduit from said chamber to said evaporator for condensed cooling liquid.

6. In refrigerating apparatus of the class described, an absorber comprising a fall tube pump connected to receive weak absorption liquid from the generator and vapor from the evaporator.

7. In refrigerating apparatus of the class described, an absorber comprising a fall tube, and an injector connected to discharge into the upper end of said fall tube and supplied with weak absorption liquid from the generator and vapor from the evaporator.

8. In refrigerating apparatus of the class described, a combined absorber and condenser comprising a fall tube pump connected to receive weak absorption liquid from the generator and vapor from the evaporator, and means for cooling the fall tube.

9. The method of refrigerating which comprises evaporating a volatile liquid in the presence of an inert gas, injecting the resulting gas mixture into a fall tube by a flow of liquid in which only the inert gas is soluble whereby the inert gas is absorbed and the volatile fluid is compressed by the weight of the liquid, condensing the compressed volatile fluid to liquid, heating the absorption liquid to expel inert gas therefrom, and again evaporating the volatile liquid in the presence of the inert gas.

10. The method of refrigerating which comprises bubbling an inert gas through a volatile liquid to evaporate the latter, simultaneously absorbing inert gas from the resulting mixture in an absorption liquid in which the inert gas is more soluble than the volatile fluid, and compressing the volatile fluid by the weight of a column of said absorption liquid, cooling the compressed fluid to condense it to a liquid, heating the absorption liquid to expel inert gas from solution, and again bubbling the inert gas through the volatile liquid.

11. In a refrigerating system of the class described, the method of operation which includes absorbing an inert gas out of mixture with a volatile fluid into an absorption liquid in which the volatile fluid is comparatively insoluble, compressing the volatile fluid by a column of absorption liquid, and cooling the compressed fluid to condense it to a liquid.

In testimony whereof I affix my signature.

BO FOLKE RANDEL.